United States Patent [19]

Wubbe

[11] 4,144,613

[45] Mar. 20, 1979

[54] HOOK-ENDED ARM CONNECTOR

[75] Inventor: Leo J. Wubbe, Beverly Shores, Ind.

[73] Assignee: The Anderson Company, Gary, Ind.

[21] Appl. No.: 764,912

[22] Filed: Feb. 2, 1977

[51] Int. Cl.² .............................................. B60S 1/40
[52] U.S. Cl. .................................................. 15/250.32
[58] Field of Search ......................... 15/250.32, 250.35; 403/324

[56] References Cited
U.S. PATENT DOCUMENTS

| | | | |
|---|---|---|---|
| 3,054,128 | 9/1962 | Prohaska | 15/250.32 |
| 3,722,927 | 3/1973 | Miska | 403/324 X |

FOREIGN PATENT DOCUMENTS

| | | | |
|---|---|---|---|
| 33684 | 12/1964 | German Democratic Rep. | 403/324 |
| 381915 | 10/1932 | United Kingdom | 15/250.35 |

*Primary Examiner*—Daniel Blum
*Attorney, Agent, or Firm*—Wegner, Stellman, McCord, Wiles & Wood

[57] ABSTRACT

A connector is provided for connecting a hooked-end windshield wiper arm to a windshield wiper blade. The connector is mounted on the blade and has a transversely operative spring-urged latch which seats beyond the hook of the hooked-end arm so as to trap the hook between the latch and the pivot on the blade so as to retain the hook in position on the blade. Transverse movement of the latch releases the hook making it possible to remove the arm from the blade.

7 Claims, 5 Drawing Figures

U.S. Patent  Mar. 20, 1979  4,144,613
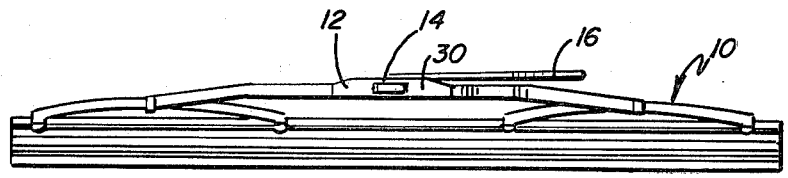
FIG. 1
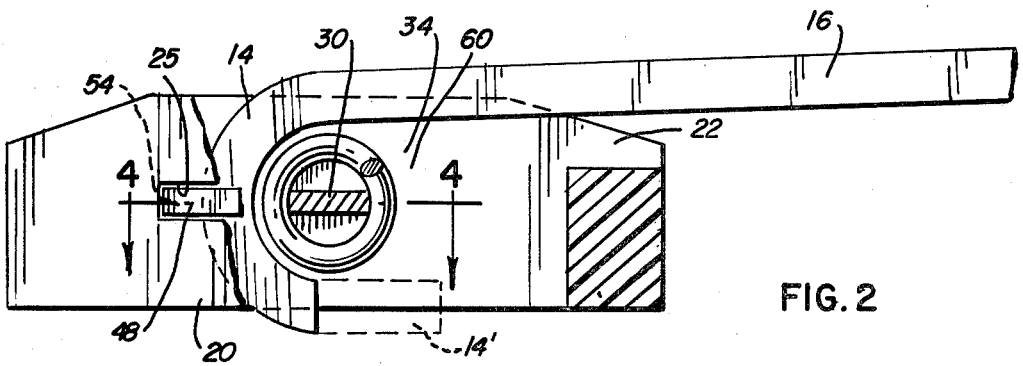
FIG. 2
FIG. 3
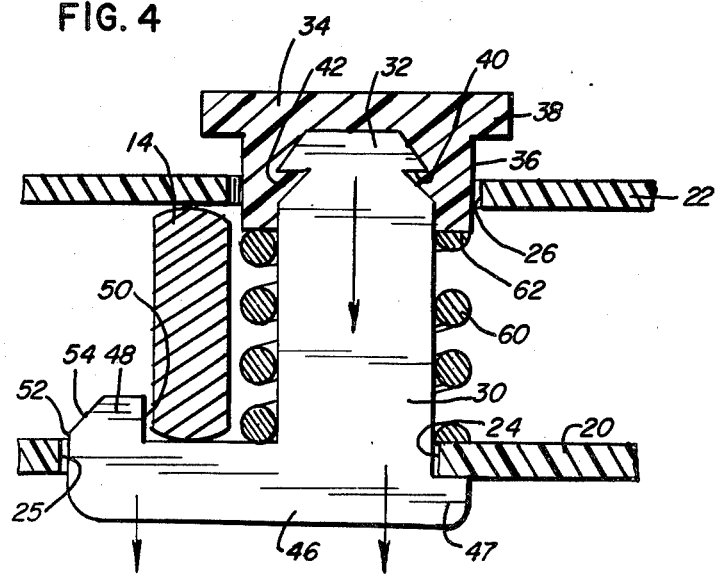
FIG. 4
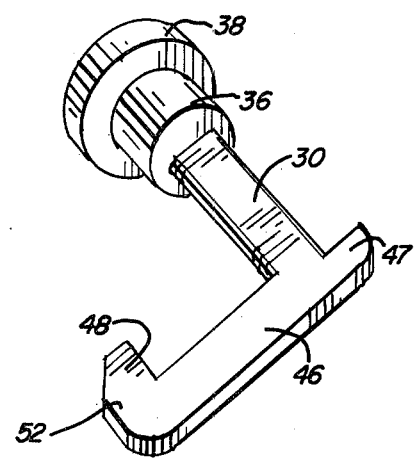
FIG. 5

HOOK-ENDED ARM CONNECTOR

BACKGROUND OF THE INVENTION

1. Field of the Invention

This invention relates to connectors for windshield wiper arms and blades and, more particularly, to a transversely actuated latch for locking a hooked-end arm to a blade.

2. Description of the Prior Art

Windshield wiper arms have been provided with many different styles and types of connector ends for use in connecting the arm to a wiper blade. One such arm end has a hook shape and is generally designated a hook-ended wiper arm. Many different connectors have been developed for securing such arm ends to wiper blades. One such connector is a U-shaped spring encircling a pivot pin between the sides of the blade. One leg of the spring has a tang or dog sticking up from the plane of the spring to engage in a recess in the hooked end of the arm to secure the arm to the blade. This connector is subject to accidental disconnection due to twisting between the arm and blade or due to resistance between the blade and the windshield, i.e. freezing the rubber to the glass. In the two just enumerated situations, the tang unseats from the detent and the arm can separate from the blade.

Another form of connector for a hook-ended arm provides for a socket member pivoted between the side walls of a blade which socket member has two side-by-side rubber or plastic pins, such that the end of the hook passes between the pins when the socket member is at a right angle to the blade. Pivoting the socket member into the confines of the side walls of the blade locks the arm to the blade. During use, the socket member can unseat from the confines of the blade making it possible to release the blade from the arm.

Those and other prior art connectors are less than satisfactory and do lead to a certain number of cases where the blade is separated from the arm with the attendant problems.

SUMMARY OF THE INVENTION

An improved connector for attaching a hook-ended wiper arm to a blade is provided which overcomes the problems of the prior art and produces an improved connection that is substantially fail proof.

A connector is provided with a pin extending either between the side walls of the blade or between the side walls of a connector housing on the blade. The pin has a head on one end located exterior of one of the side walls and has a laterally projecting catch with an overhanging lug, which lug lies substantially parallel to the axis of the pin and projects into the open space between the side walls of said blade or housing. A spring urges the catch, lug and pin in a direction to maintain said lug in said open space between the side walls. The hook end of an arm is nested about the pin such that the lug on the catch is behind the hook end of the arm so as to trap the hook end between the lug and the pin to hold the arm to the blade. The arm is released from the blade by depressing the head so as to compress the spring and move the lug on the catch out from behind the hook end of the arm thereby releasing the arm for removal from the blade.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a wiper blade and a wiper arm incorporating the improved connector;

FIG. 2 is an enlarged partially broken away elevational view of the improved connector of FIG. 1;

FIG. 3 is a top plan view of the connector of FIG. 2;

FIG. 4 is an enlarged, partial cross-sectional view taken along the lines 4—4 of FIG. 2; and FIG. 5 is a perspective view of the knob and pin assembly.

DESCRIPTION OF THE PREFERRED EMBODIMENT

A preferred form of the invention is illustrated in the drawings wherein like reference numerals will refer to like parts throughout and, in particular, in FIG. 1 is illustrated a windshield wiper blade 10 carrying a connector 12 in which is connected a hook end 14 of a hook-ended windshield wiper arm 16. The blade 10, that is illustrated, is a triple yoke windshield wiper blade of the type invented by John W. Anderson and first broadly shown in U.S. Pat. No. 2,596,063. It is to be understood that the connector 12 of the present invention could be used on any windshield wiper blade, whether it is a stiff-backed blade, a single, double, triple or quadruple yoke blade, or any other appropriate blade.

The connector 12, as illustrated, is formed integrally with the secondary yoke 18 of the wiper blade 10 and has a pair of spaced apart, substantially parallel side walls 20,22. It should be recognized that the connector 12 could be a separate housing attached to the back of the yoke of the wiper blade without departing from the invention. The side walls 20 and 22 have aligned openings 24 and 26, respectively, with the opening 26 being circular and with the opening 24 being circular throughout a major portion thereof and having a rectangular-shaped open portion 25 extending sidewardly therefrom, the height of said rectangular portion 25 being substantially less than the diameter of the opening 24 so as to form a keyhole-shaped opening therein. A flat stamped metal latch or pin 30 bridges the space between the side walls 20 and 22 with the one end portion 32 projecting beyond the plane of the side wall 22 and having a knob portion 34 attached thereto. The knob 34 has a reduced diameter portion 36 that is small enough to clear the inside of the opening 26 and has an enlarged head portion 38 which overhangs the edges of the opening 26 so that the knob 34 cannot pass through the opening 26. The knob 34 is attached to the pin 30 by means of barbs or undercuts 40 on the pin 30 and ledges 42 on the knob 34, the knob 34 being formed of a plastic-type material and being adapted to forcibly receive the barbed end of the pin 30 and to be locked together by means of the interaction of said barbs and ledges. In the alternative, the pin 30 with the undercut 40 can be molded into the knob 34 to form a one piece structure. FIG. 5 shows the pin 30 and knob 34 assembly prior to insertion in the connector housing.

The opposite end of the pin 30 projects through the opening 24 and has a rectangularly-shaped, laterally extending catch or latch portion 46. The latch portion 46 has an overhanging ledge portion 47 which extends in overlapping relation with the edge of the wall 20 around the opening 24 so as to prevent the pin 30 from passing back through the opening 24. The latch portion 46 projects laterally from the axis of the pin 30 has an integrally formed inturned lug 48 doubling back on the pin 30 and has a planar face 50 which lies parallel to the axis of the pin 30 and is in overlapping relationship to the outer wall of the pin 30. The latch portion 46 projects through the opening 24 and through the rectangular portion 25 of the opening with the lug 48 extending back into the open space between the side walls 20 and 22. The remote wall 52 of the lug 48 has a tapered portion 54 with the junction of the taper 54 and the wall 52 being about the place of the inside of the wall 20.

A coil spring 60 encircles the body of the pin 30 and has one end bearing against the inner wall 20 with the other end bearing against the axially facing, laterally, outwardly extending wall 62 of the knob 34. The spring 60 is under compression so as to hold the ledge portion 47 of the latch 46 against the outer wall 20 with the lug 48 extending into the space between the side walls 20 and 22. At the same time, the overhang 38 of the knob 34 is urged away from the outside of the wall 22. Pressure on the knob 34 transverse to the plane of the side walls 20 and 22 and axially along the pin 30 will compress the spring 60 and move the overhanging portion 38 of the knob 34 against the outside wall 22 as the latch portion 46 is moved laterally outwardly with respect to the wall 20. At this point, the lug 48 is moved out of the open space between the side walls 20 and 22 so that the lug 48 does not extend into the area between the side walls 20 and 22. The space between the overchange 38 and the outside of wall 22 is substantially equal to the lateral distance the planar face 50 extends into the space between the walls 20 and 22.

The present connector 12 is intended for use with the hook end 14 of a hook-ended windshield wiper arm 16. As best shown in FIG. 2, the wiper arm 16 has a modified hook-shaped end 14 with the hooked end 14 wrapping around approximately 180° of the spring 60 and the pin 30. Also, as viewed in FIG. 4, the lug 48 of the latch 46 is in position behind the hooked end 14 of the hook-end arm 16 so as to trap the hooked end 14 between the lug 48 and the pin 30 of the connector 12. Also, as shown in FIG. 4, the hooked end 14 of the arm 16 is positioned between the side walls 20 and 22 and is trapped between the lug 48 of the latch 46 and the pin 30.

Transverse pressure on the knob 34 will move the pin 30 transverse to the plane of the side walls 20 and 22 so as to move the lug 48 out of the space between the side walls 20 and 22 and out of entrapping relationship with respect to the hook end 14 of the arm 16. With the knob 34 depressed, the arm end can be moved outwardly from the pin 30 and spring 60 until the end of the hook end 14 clears the spring 60 whereupon the arm 16 can be lifted upwardly, away from the connector 12 and blade 10. As shown in dashed lines in FIG. 2, the arm end may be extended as at 14' which will afford a more positive connection and further reduce the likelihood of the arm becoming accidentally displaced.

To assemble the arm 16 to the blade 10, one of two methods can be employed. In one case, the hook end 14 of the arm 16 is dropped down between the side walls 20,22 at a point removed from the lug 48. The arm 16 is then moved relative to the blade 10 until the hook end 14 engages the tapered wall 54 of the lug 48. Continued relative movement will cause the hook end 14 to force the lug 48 and pin 30 transverse to the walls 20,22 until the hook end 14 passes over the lug 48 whereupon the spring 60 forces the lug 48 into latching position by trapping the hook end 14 between the lug 48 and the pin 30. In the other case, it is necessary to depress the knob 34 to remove the lug 48 from the space between the side walls 20 and 22 whereupon the arm end is dropped into the space between the side walls 20 and 22 and is moved into nesting relation around the spring 60 and pin 30, whereupon release of the knob 34 will move the pin 30 axially thereof to align the lug 48 behind the hook end 14 and trap the hook end 14 between the lug 48 and the pin 30. In this position, the arm end is positively locked by means of the connector 12 to the blade 10. In either case, the hook end 14 cannot become separated from the connector 12 of the blade 10 until the lug 48 on the latch 46 is moved out of alignment with the hook end 14 of the arm 16 whereupon the arm 16 can be separated from the blade 10. The present construction provides a positive latching arrangement for an arm end to the blade which cannot be accidentally displaced from the locking position. In this way, the arm 16 is positively locked to the blade 10 for safe and efficient operation.

I claim:

1. A connector for connecting a hook-ended windshield wiper arm to a windshield wiper blade, said wiper blade having a pair of substantially parallel, spaced apart side walls, a pair of substantially aligned openings in said side walls, a pin extending between said side walls and through said openings, a lug carried by the pin and being selectively disposed in the open space between said side walls and being spaced from said pin to trap the hook end therebetween spring means for urging the pin and lug to one selective position so that the lug extends into latching position in said open space between the side walls, and said pin being depressible against said spring means to move the lug to another selective unlatched position removed from the space between the side walls.

2. A connector as claimed in claim 1 wherein said spring means is a coil spring encircling the pin and bearing against one side wall and against a knob on the pin so as to urge the lug into said latching position between the side walls of the connector.

3. A connector as claimed in claim 1 wherein said pin has a laterally extending member forming latch means with the lug formed on the remote end of said member, said member and said lug lying in a slot joined with the opening in one of said side walls of said connector.

4. In a windshield wiper assembly comprising a wiper arm having a hook-shaped end portion, a windshield wiper blade having a holder with a pair of substantially parallel spaced apart side walls, a pair of aligned openings in said side walls, a pin extending between the side walls and through the openings in said side walls, a knob connected to one end of said pin and extending exteriorly of one of said side walls, a latch means carried by the other end of said pin and having a portion disposed exteriorly of the other side wall, a lug formed on said latch means and extending substantially parallel to said pin in overlapping relationship to the pin, spring means for urging the pin and the lug in a direction so that the lug extends into the open space between the side walls to trap the hook-shaped end portion of the arm between the lug and the pin, said pin adapted to be manually urged in a direction transverse to the plane of the side walls to depress the spring and remove the lug from the position between the side walls whereby the hook-shaped end portion of the arm can be removed from the pin and from the wiper blade. removed from the pin and from the wiper blade.

5. In a windshield wiper assembly as claimed in claim 4 wherein said spring means is a coil spring encircling the pin and bearing against one side wall and against said knob so as to urge the lug into position between the side walls of the connector.

6. In a windshield wiper assembly as claimed in claim 4 wherein said pin has an integrally formed, transversely extending member forming said latch means with the lug formed on the remote end of said member, said member and said lug lying in a slot joined with the opening in said one side wall of said connector whereby movement of the knob moves the latch means and lug in said slot and opening as the lug is moved into and out of locking position between said side walls.

7. In a connector for connecting a hook-ended windshield wiper arm to a windshield wiper blade comprising, a pair of substantially parallel spaced apart side walls carried by said blade, a pair of aligned openings in said side walls, a pin extending between the side walls and through the openings in said side walls, a knob connected to one end of said pin exteriorly of one of said side walls, a latch means carried by the other end of said pin and having a portion disposed exteriorly of the other side wall, a lug formed on said latch means and extending substantially parallel to said pin in overlapping relationship to the pin, spring means for urging the pin and the lug in a direction so that the lug extends into the open space between the side walls, said pin adapted to be manually urged in a direction transverse to the plane of the side walls to depress the spring and remove the lug from the position between the side walls, and said lug having a tapered remote wall whereupon pressure on said tapered wall by the hook end of a windshield wiper arm will move the lug and pin transverse to the planes of the side walls to permit the hook end to pass into latching position between the lug and the pin.

* * * * *

UNITED STATES PATENT AND TRADEMARK OFFICE
CERTIFICATE OF CORRECTION

PATENT NO. : 4,144,613
DATED : March 20, 1979
INVENTOR(S) : Leo J. Wubbe

It is certified that error appears in the above-identified patent and that said Letters Patent are hereby corrected as shown below:

Column 3, line 16, after "about" insert --in--;

line 35, "overchange" should be --overhang--.

Column 4, line 36, after "therebetween" insert a comma --,--.

Column 5, lines 5 and 6, after the period "." delete

"removed from the pin and from the wiper blade.".

Signed and Sealed this

Twenty-fourth Day of July 1979

[SEAL]

Attest:

LUTRELLE F. PARKER

*Attesting Officer*     *Acting Commissioner of Patents and Trademarks*